US009053744B2

(12) United States Patent
Cherubini et al.

(10) Patent No.: US 9,053,744 B2
(45) Date of Patent: Jun. 9, 2015

(54) TAPE STORAGE SYSTEM (71) Applicant: International Business Machines Corporation, Armonk, NY (US)

(72) Inventors: Giovanni Cherubini, Rueschlikon (CH); Johan B. C. Engelen, Rueschlikon (CH); Simeon Furrer, Rueschlikon (CH); Jens Jelitto, Rueschlikon (CH); Mark A. Lantz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/450,611

(22) Filed: Aug. 4, 2014

(65) Prior Publication Data
US 2015/0062740 A1    Mar. 5, 2015

(30) Foreign Application Priority Data

Aug. 29, 2013    (GB) .................................. 1315325.9

(51) Int. Cl.
G11B 5/584    (2006.01)
G11B 20/12    (2006.01)

(52) U.S. Cl.
CPC ............ *G11B 20/12* (2013.01); *G11B 20/1204* (2013.01); *G11B 2020/1281* (2013.01); *G11B 5/584* (2013.01)

(58) Field of Classification Search
None
See application file for complete search history.

(56) References Cited

U.S. PATENT DOCUMENTS

| 5,291,348 | A | 3/1994 | Copolillo | |
|---|---|---|---|---|
| 6,525,898 | B1* | 2/2003 | Chliwnyj et al. | .......... 360/77.12 |
| 7,876,521 | B2 | 1/2011 | Cherubini et al. | |
| 7,903,368 | B2 | 3/2011 | Bui et al. | |
| 8,027,111 | B2 | 9/2011 | Cideciyan et al. | |
| 8,274,752 | B2 | 9/2012 | Cherubini et al. | |
| 2004/0223248 | A1 | 11/2004 | Dugas et al. | |
| 2005/0099715 | A1* | 5/2005 | Yip et al. | ........................ 360/48 |
| 2007/0041121 | A1* | 2/2007 | Neumann | .................. 360/77.12 |
| 2009/0040643 | A1 | 2/2009 | Weng et al. | |

FOREIGN PATENT DOCUMENTS

JP    2006221729 A    8/2006

OTHER PUBLICATIONS

A.J. Argumedo, et al., "Scaling Tape-Recording Areal Densities to 100 Gb/in2," IBM J. Res and Dev., vol. 52, No. 4/5, Jul.-Sep. 2008, IBM, pp. 513-527.
Intellectual Property Office UK; Application No. GB1315325.9; Patents Act 1977: Search Report Under Section 17(5); Date Mailed: Feb. 26, 2014; pp. 1-3.

* cited by examiner

*Primary Examiner* — Andrew L Sniezek
(74) *Attorney, Agent, or Firm* — Cantor Colburn LLP (57) ABSTRACT

A tape storage medium includes a tape head for reading/writing data from/to a tape storage medium. At least one servo band along a longitudinal extension of the tape storage medium determines positional information. The servo band includes a set of servo tracks having a width extending along the longitudinal extension and arranged next to each other. A total of two different servo patterns are contained in the set of servo tracks. The tape head includes two servo readers. A width of each servo reader orthogonal to the longitudinal extension of the tape storage medium is at least half the width of a servo track. The two servo readers are offset from each other orthogonal to the longitudinal extension by $d*wST + n*wST$ with wST being the width of the servo track, with $0<d<1$, and with n being an integer.

20 Claims, 4 Drawing Sheets

TAPE STORAGE SYSTEM

FOREIGN PRIORITY

This application claims priority to Great Britain Patent Application No. 1315325.9, filed Aug. 29, 2013, and all the benefits accruing therefrom under 35 U.S.C. §119, the contents of which in its entirety are herein incorporated by reference.

BACKGROUND

The present invention relates to a tape storage system and to a method for operating a tape storage system.

Tape storage media typically comprise servo information prerecorded in one or more of dedicated servo bands that extend next to data bands for storing data, which servo bands extend in a longitudinal direction along the tape medium. A servo band typically is read by a dedicated servo reader of a tape head of a tape drive, into which tape drive a cartridge containing the tape storage medium is inserted to. The read servo information allows for determining a lateral deviation of the tape storage medium from a reference position, which reference position is desired for correctly reading data from and writing data to the tape storage medium by dedicated data readers and writers of the tape head. A position error signal representing the lateral deviation will be translated into a control signal for an actuator for controlling a lateral position of the tape head with respect to the tape medium.

SUMMARY

In one embodiment, a tape storage system includes a tape head configured to read and/or write data from and/or to a tape storage medium; the tape storage medium comprising at least one servo band along a longitudinal extension of the tape storage medium to determine positional information, and wherein: the servo band comprises a set of servo tracks having a width extending along the longitudinal extension of the tape storage medium and arranged next to each other; each servo track of the set contains a servo pattern; a total of two different servo patterns is contained in the set of servo tracks; the servo patterns of adjacent servo tracks are different from each other; the tape head comprises two servo readers configured to read from the servo band; a width of each servo reader orthogonal to the longitudinal extension of the tape storage medium is at least half the width of a servo track; and the two servo readers offset from each other orthogonal to the longitudinal extension of the tape storage medium by $d*wST+n*wST$, wherein wST is the width of the servo track, with $0<d<1$, and with n being an integer $n=[0, 1, 2 \ldots, N]$ where N corresponds to the number of servo tracks in the set.

In another embodiment, a method for operating a tape storage system includes reading a servo band by two servo readers configured to read from the servo band; and determining a lateral position value of a tape head containing the servo readers relative to a tape storage medium from a readback signal of the servo readers and adjusting a lateral position of the tape head dependent on the lateral position value. The tape storage system includes the tape head configured to read and/or write data from and/or to the tape storage medium; the tape storage medium comprising the servo band along a longitudinal extension of the tape storage medium to determine positional information; the servo band comprising a set of servo tracks having a width extending along the longitudinal extension of the tape storage medium and arranged next to each other; each servo track of the set containing a servo pattern; a total of two different servo patterns contained in the set of servo tracks; the servo patterns of adjacent servo tracks being different from each other; the tape head comprising the two servo readers configured to read from the servo band; a width of each servo reader orthogonal to the longitudinal extension of the tape storage medium is at least half the width of a servo track; and the two servo readers offset from each other orthogonal to the longitudinal extension of the tape storage medium by $d*wST+n*wST$, wherein wST is the width of the servo track, with $0<d<1$, and with n being an integer $n=[0, 1, 2 \ldots, N]$ where N corresponds to the number of servo tracks in the set.

In another embodiment, a computer program product includes a non-transitory, computer readable storage medium having computer readable program code embodied therewith, the computer readable program code comprising instructions that, when executed by a computer perform a method for operating a tape storage system. The method includes reading a servo band by two servo readers configured to read from the servo band; and determining a lateral position value of a tape head containing the servo readers relative to a tape storage medium from a readback signal of the servo readers and adjusting a lateral position of the tape head dependent on the lateral position value. The tape storage system includes the tape head configured to read and/or write data from and/or to the tape storage medium; the tape storage medium including the servo band along a longitudinal extension of the tape storage medium to determine positional information; the servo band including a set of servo tracks having a width extending along the longitudinal extension of the tape storage medium and arranged next to each other; each servo track of the set containing a servo pattern; a total of two different servo patterns contained in the set of servo tracks; the servo patterns of adjacent servo tracks being different from each other; the tape head comprising the two servo readers configured to read from the servo band; a width of each servo reader orthogonal to the longitudinal extension of the tape storage medium is at least half the width of a servo track; and the two servo readers offset from each other orthogonal to the longitudinal extension of the tape storage medium by $d*wST+n*wST$, wherein wST is the width of the servo track, with $0<d<1$, and with n being an integer $n=[0, 1, 2 \ldots, N]$ where N corresponds to the number of servo tracks in the set.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION

According to an embodiment of a first aspect of the present invention, a tape storage system is provided comprising a tape head for reading and/or writing data from and/or to a tape storage medium.

The tape storage medium comprises at least one servo band along a longitudinal extension of the tape storage medium for supporting to determine positional information. The servo band comprises a set of servo tracks of a width extending along the longitudinal extension of the tape storage medium and arranged next to each other. Each servo track of the set contains a servo pattern. A total of two different servo patterns is contained in the set of servo tracks. The servo patterns of adjacent servo tracks are different from each other. The tape head comprises two servo readers assigned for reading from the servo band. A width of each servo reader orthogonal to the longitudinal extension of the tape storage medium is at least half the width of a servo track. The two servo readers are offset from each other orthogonal to the longitudinal extension of the tape storage medium by $d*wST+n*wST$ with wST being the width of the servo track, with $0<d<1$, and with n being an integer $n=[0, 1, 2 \ldots N]$ where N corresponds to the number of servo tracks in the set.

In embodiments, the tape storage system may comprise one or more of the following features: the number of servo tracks in the set corresponds to the number of servo tracks in the servo band; $n=0$, and the two servo readers are offset from each other along the longitudinal extension of the tape storage medium; $n \neq 0$, and the two servo readers are arranged at the same longitudinal position with respect to the longitudinal extension of the tape storage medium; $n=1$; $n=2$; $0.3<d<0.7$; $d=0.5$; the tape head comprises a total of two servo readers assigned for reading from the servo band; the width of each servo reader is half the width of a servo track; the width of each servo reader is equal to the width of a servo track; the width of each servo reader is not more than twice the width of the servo track; the width of each servo reader is within ±12.5% of the width of a servo track; each servo pattern in a servo track represents a waveform when being read, and the waveforms of adjacent servo tracks are orthogonal to each other; the servo pattern of each servo track of the set contains magnetic transitions at a defined frequency, and the frequencies of magnetic transitions of servo patterns of adjacent servo tracks are different from each other; the servo pattern of each servo track of the set contains a pseudo noise sequence of symbols, and the pseudo noise sequences of servo patterns of adjacent servo tracks are different from each other; the two pseudo noise sequences of symbols are written such that a phase shift between corresponding symbols located on adjacent tracks is within ±12.5% of a symbol length.

Additional information is encoded in the servo pattern of one or more servo tracks, which additional information is one or more of: longitudinal position information, manufacturing information, a servo band identifier, a servo track subset identifier; the servo pattern of one or more of the servo tracks is designed to allow one or more of generating a reference periodic signal from a readback signal of one or more of the servo readers for supporting a timing recovery process for data detection purposes or generating tape velocity information for tape velocity control purposes.

According to an embodiment of another aspect of the present invention, a method is provided for operating a tape storage system according to any one of the preceding embodiments, comprising reading the servo band by the servo readers, determining a lateral position value of the tape head containing the servo readers relative to the tape storage medium from a readback signal of the servo readers and adjusting a lateral position of the tape head dependent on the lateral position value.

In embodiments, the method may comprise one or more of the following features: determining the lateral position value includes identifying one or more pseudo noise sequences in the readback signal of each servo reader; the readback signal of each servo reader is filtered by applying correlation operations for determining the lateral position value; one or more ratios are built from energies of different pseudo noise sequences identified and the lateral position value is derived from the one or more ratios; determining the lateral position value includes identifying one or more defined spectral components in the readback signal of each servo reader; one or more ratios are built from energies of the different spectral components identified and the lateral position value is derived from the one or more ratios; the lateral position of the tape head is adjusted by a control signal that is updated each time a new lateral position value is determined.

According to a further aspect of the present invention, a computer program product is provided comprising a computer readable medium having computer readable program code embodied therewith, the computer readable program code comprising computer readable program code configured to perform a method according to any of the previous embodiments.

Embodiments described in relation to the aspect of write head shall also be considered as embodiments disclosed in connection with any of the other categories such as the method.

As an introduction to the following description, it is first pointed at a general aspect of the invention concerning a tape storage system and a method for operating a tape storage system.

A tape storage medium for storing data (also abbreviated as tape), and in particular a magnetic tape storage medium may be arranged in a cartridge which cartridge may be inserted into a tape drive for reading data from the tape storage medium and writing data to the storage tape medium. The tape storage medium has a longitudinal extension and a width orthogonal to its longitudinal extension. The tape is wound onto one or more reels which are driven by the tape drive in order to make the tape pass by data readers and writers of a tape head for reading and/or writing data from and/or to the tape storage medium. The tape storage medium typically is preformatted with servo information. This servo information in form of servo patterns enables servo readers of the tape head during reading and/or writing data to pick up servo information as to a lateral position of the tape head with respect to the tape storage medium, which lateral position is a position orthogonal to the longitudinal extension of the magnetic tape storage medium. Such position information may be converted into a control signal for the tape head to laterally re-adjust in case a deviation from a lateral reference position is detected which lateral reference position is desired to be maintained by the tape head for correctly reading data from and writing data to the tape by the dedicated data readers and writers. The deviation signal, also denoted as position error signal (PES), is typically supplied by a servo channel processing a readback signal from the dedicated servo reader of the tape head and may be translated into a control signal for an actuator for controlling the lateral position of the tape head with respect to the tape. Given that in one embodiment the servo readers and the data readers and writers are mechanically coupled and can commonly be actuated by the actuator, a rapid correction of the tape head deviation may be achieved during reading and/or writing data from and/or to the tape. It is understood, that the term tape head may also refer to a tape head module into which the servo readers and data readers and/or writers are mechanically coupled while at the same time there may be additional tape head modules containing other servo readers and data readers and/or writers are mechanically coupled which tape head modules may individually be controllable in their lateral position.

The servo patterns typically are preformatted, e.g., by the tape manufacturer, on dedicated areas of the tape also denoted as servo bands extending along the longitudinal extension of the tape. The one or more servo bands extend next to data bands for storing data. Each data band may contain multiple data tracks, wherein each data track is provided for sequentially storing data. Servo information may take a shape different from data.

In a preferred embodiment, the tape storage medium comprises at least one servo band. In case of multiple servo bands, it is preferred that each servo band contains a structure with multiple servo tracks as will be explained in more detail in the following. In particular, each servo band may then contain the identical servo information except for servo band or servo track specific information such as a servo band identifier if any.

The servo band contains multiple servo tracks adjacent to each other extending along a longitudinal extension of the servo band, i.e., along a longitudinal extension of the tape storage medium. Such multiple servo tracks adjacent to each other in a servo band are also denoted as set of servo tracks. The servo tracks of the set may contain different servo patterns which allow for a precise position control. It is preferred, that solely two different servo patterns are used in the various servo tracks of the same set. While the set may preferably contain at minimum three servo tracks, more than three servo tracks may be envisaged such as in particular an even number of servo tracks, such as four, six, etc. Given that adjacent servo tracks preferably contain different servo patterns, the two different servo patterns preferably alternate across the servo tracks of the set. Preferably, the multiple servo tracks are the sole servo patterns in the servo band, and in particular there is no additional frame based servo pattern provided in the same servo band.

Given that the tape storage medium typically is a magnetic storage medium, the servo pattern in each servo track is represented by magnetic transitions along the servo track. Such magnetic transitions represent a waveform in a readback signal of an assigned servo reader when such servo pattern would individually be read. In this context it is emphasized, that the waveform resulting from a servo pattern in an individual servo track shall encompass a representation of the subject signal in both, the time domain and the frequency domain.

In case such servo band is read by a servo reader with a width being at least half the width of an individual servo track in this servo band—and preferably less than an accumulation of the widths of all servo tracks, and preferably less than twice the width of the servo track, and even more preferably approximately equal to the width of a servo track—such servo reader may either provide a readback signal with a single waveform originating from a single track only in case the servo reader is exactly positioned over the center of one of the tracks and as such exclusively covers this track and provided its width is equal to the width of a servo track. Or, a readback signal containing two or more different waveforms originating from two or more tracks may be provided if the servo reader covers these two or more servo tracks at least to some extent which may be the case when its width is equal to the width of a servo track and the servo reader position extends over two different servo tracks, or is the case independent from its position when the width of the servo reader is more than the width of a servo track. The subject waveforms then overlap in the readback signal of the servo reader. In other words, the readback signal of the servo reader may be composed of two or more overlying different waveforms stemming from magnetic transitions of adjacent servo tracks the servo reader currently scans. For allowing determining which waveforms are present in a readback signal of the servo reader, it is preferred that the waveforms of adjacent servo tracks are orthogonal to each other. This means, that the waveforms and hence the underlying servo patterns in at least two adjacent servo tracks are distinguishable when being present in a common signal or channel at least in one of the time domain or the spectral domain such that by applying an appropriate analysis in either of the domains, the waveforms contained in the readback signal can be identified.

Given that overall two different waveforms are used in the servo tracks of the set, it is preferred that these waveforms, and hence the underlying servo patterns are orthogonal to each of the other. Orthogonality in multichannel signal transmission preferably is fulfilled if a product of the spectrum or a correlation of the time function of the subject waveform with a waveform in an adjacent track is zero. This means, that a cross-correlation between any two different waveforms preferably is zero either in the time domain or in the spectral domain for all different waveforms applied such that the waveforms preferably used in the different servo tracks, and hence their underlying magnetic transition schemes defining the different servo patterns are preferably orthogonal.

In one embodiment, the different waveforms resulting from reading the underlying different servo patterns are characterized in the time domain by different defined pseudo noise sequences in the subject servo tracks. Specifically, a pseudo noise sequence comprises a sequence of binary symbols and as such a defined bit pattern of a given length of binary symbols. The pseudo noise sequence assigned to a servo track preferably is periodically repeated along the servo track such that each servo track contains a repetition of the assigned pseudo noise sequence. The pseudo noise sequences of different servo tracks may be aligned in phase or offset in phase, i.e., a pseudo noise in one servo track may start at a different time than a pseudo noise sequence in another servo track. The symbols of pseudo noise patterns of different servo tracks may be aligned in phase or offset in phase. The waveforms of the different bit patterns used are orthogonal in the time domain which qualifies as suitable waveforms. The readback signal of the servo reader then preferably is analyzed in the time domain. The two different pseudo-noise sequences used in one embodiment are preferably characterized by good cross-correlation properties. Such sequences in one example may be Gold sequences.

Alternatively, the two different pseudo noise sequences used may originally be derived from a single pseudo noise sequence with good autocorrelation properties. Such pseudo noise sequence may include Barker codes, complementary sequences or maximal length sequences. In this embodiment, the servo patterns of two adjacent servo tracks are written with the same pseudo noise sequence, however, with a phase offset of multiple symbols and/or opposite polarities. Still the pseudo sequences of the different servo tracks are considered to be different given that their waveforms are distinguishable in the readback signal. An advantage of this scheme is that a detector may include only a single sequence correlator. The output signal of this correlator may show pairs of peaks that are spaced in time according to the pseudo noise sequence phase offsets between adjacent tracks read by the servo reader and/or pairs of peaks with opposite polarity. In a preferred embodiment, the distance between peaks of a pair can be used to encode a servo track identifier. I.e., the phase shift may additionally represent a servo track identifier. In another embodiment, for the case of applying two pseudo noise sequences, a tape velocity may be determined dependent on the distance between peaks in the outputs of the two correlators. For the case of applying a single pseudo noise sequence, the tape velocity may be determined dependent on the distance between two consecutive peaks in the output of the single correlator.

The amplitude/magnitude values of the correlator output peaks (peak pairs) can then be used as described below. The underlying servo patterns arranged in the different servo tracks may preferably belong to a class of energy based servo (EBS) patterns. If such servo patterns of multiple servo tracks are read by a single servo reader covering multiple of the servo tracks while reading, the readback signal from the servo reader provides different energies of the different pseudo noise sequences present in the readback signal subject to the coverage of the different servo tracks. By means of estimating and/or evaluating the energies of the different pseudo noise sequences in the readback signal and specifically by building ratios between the various energies, a lateral position of the servo reader can be determined with respect to the tape. In case a data reader for reading data and a data writer for writing data are mechanically coupled with the subject servo reader, any lateral deviation of the subject servo reader detected by reading the servo band also is valid for the data reader and the data writer. Hence, any lateral actuation of the tape head including the subject servo reader, the data reader and the data writer may correct for the detected deviation and bring the data reader and the data writer back on their desired lateral positions.

In a different embodiment, the different waveforms resulting from reading the different underlying servo patterns are characterized in the spectral domain by different defined frequencies of magnetic transitions in the subject servo track. Specifically, a waveform with a defined frequency in the spectral domain is a periodic waveform in the time domain, and preferably a sinusoidal waveform in the time domain. Those waveforms are orthogonal in the spectral domain which qualifies them as suitable waveforms. Here, the readback signal of the servo reader then preferably is analyzed in the spectral domain. The underlying servo patterns arranged in the different servo tracks may preferably belong to a class of energy based servo (EBS) patterns. If such servo patterns of multiple servo tracks are read by a single servo reader covering a multiple of the servo tracks while reading, the readback signal from the servo reader provides different energies at different frequencies subject to the coverage of the different servo tracks. By means of evaluating the energies in the readback signal at the various frequencies and specifically by building ratios between the various energies, a lateral position of the servo reader can be determined with respect to the tape. In case a data reader for reading data and a data writer for writing data are mechanically coupled with the subject servo reader, any lateral deviation of the subject servo reader detected by reading the servo band also is valid for the data reader and the data writer. Hence, any lateral actuation of the tape head including the subject servo reader, the data reader and the data writer may correct for the detected deviation and bring the data reader and the data writer back on their desired lateral positions.

In a preferred embodiment, the tape storage system comprises a tape head containing two servo readers for reading from the servo band. A total number of servo readers for reading servo information from the entire tape may exceed the number of two given that typically there is more than one servo band for reading servo information from. Preferably, a width of each servo reader orthogonal to the longitudinal extension of the tape storage medium is approximately equal to the width of the servo track in the servo band orthogonal to the longitudinal extension of the tape storage medium. Preferably, both servo readers have the same width. Preferably, the two servo readers are offset from each other orthogonal to the longitudinal extension of the tape storage medium by $(d*wST+n*wST)$. This measure constitutes an offset oR in lateral direction with wST being the width of the servo track, with $0<d<1$, and with n being an integer $n=[0, 1, 2 \ldots N]$ where N corresponds to the number of servo tracks in the set of servo tracks, and preferably in the servo band provided the set of servo tracks contains all servo tracks of the servo band. Whenever the widths of the two servo readers may differ from each other, the offset may be defined as a distance in lateral direction between the centers of the servo readers. Otherwise, the offset may be determined between any of the bottom edges of the servo readers, the top edges of the servo readers or the centers of the servo readers. As a result of this arrangement of the servo readers with respect to each other, the lateral position of the corresponding tape head can be determined.

There may be two basic embodiments: In a first embodiment, $n=0$ such that the two servo readers partially overlap given that the resulting offset $oR=d*wST$. This leads to an arrangement where the two servo readers are offset from each other also in longitudinal direction. In this scenario, when providing a set containing three servo tracks with alternating servo patterns any lateral position of the tape head can unambiguously be determined by the servo reader arrangement without having to encode servo track numbers in the respective servo track since by the staggered arrangement of the second servo reader relative to the first servo reader allows to discriminate each transition between any of the servo tracks.

In a different embodiment $n \neq 0$ such that the two servo readers can be arranged in an aligned configuration in lateral direction, i.e., at a common longitudinal position. However, still the two servo readers can also be offset from each other also in longitudinal direction in a different embodiment. In any such embodiment of $n \neq 0$, the lateral offset of the two servo readers at minimum exceeds the widths of the servo track, i.e., $oR>wST$. When providing a set containing three or four servo tracks with alternating servo patterns, any lateral position of the tape head can unambiguously be determined by the servo reader arrangement without having to encode servo track numbers in the respective servo track since by the staggered arrangement of the second servo reader relative to the first servo reader allows to discriminate each transition between the servo tracks.

In a preferred embodiment, d is defined by $0<d<1$. In other words, d can be any real number between 0 and 1. This means that the lateral offset is always unequal to a multiple of the servo track width wST such that the servo readers always reflect energy portions of the different two servo patterns in their readback signals which allows for the discrimination of the lateral position as explained above. Preferably, d is dimensioned by $0.3<d<0.7$, and in a very preferred embodiment $d=0.5$.

Servo patterns of the present kind may be written during tape manufacturing, or may be written during operation of the tape storage medium in a tape drive, i.e., by self-servo writing. In the servo writing during tape manufacturing, a write head for writing the servo patterns into the servo band is preferred to enable writing the two different servo patterns to the different servo tracks at the same time, i.e., the servo patterns are written to the multiple adjacent servo tracks of the reel, i.e., the tape is required to pass the write head only once for writing the desired servo patterns. In a preferred embodiment, continuous writing is applied for writing the servo patterns to the tape. In continuous writing, which is also denoted as trailing-edge writing, the write head continuously writes without interruption, i.e., a current applied to the write head is continuously switched between positive and negative current values. This enables writing features that are much smaller than when using pulsed writing in which the current is switched on and off while moving the tape by the write head.

In self servo writing the servo patterns are written concurrently with the writing of data tracks. In this case, a tape head module preferably hosts an additional writer, acting as self-servo writer, and a dedicated self-servo reader. Note that a placement of a self-servo writer/reader pair can be anywhere within the tape head, e.g., in the center. Also note that, in principle, more than one self-servo writer/reader pair can be implemented in the tape head module. In any case of servo writing, only two write elements are needed in view of only two different servo patterns being used. For example, first write element contains a write gap extending along the entire width of the servo band. By applying an alternating current with at a first frequency to the write element, a magnetization at a first frequency occurs at the write gap. A second write element contains a sufficient narrow write gap for writing only at portions along the width of the servo band, thereby only writing every second servo track at a second frequency which magnetization then overwrites the servo pattern written by the first write element. Only these two write elements arranged next to each other in longitudinal direction are required which makes the servo writing process less sensitive to skew.

Note that further information can be embedded in the pseudo noise sequence patterns such as LPOS (Longitudinal Positioning Information), servo band ID, servo track ID, manufacturing information etc. by, e.g., modulating the amplitude, phase or polarity of the pseudo noise sequences, or leaving short gaps between bursts of each pseudo noise sequence or bursts of frequency patterns, and encoding the information in the presence or absence of a gap or in the length of a gap. Even in the event of such gaps, the associated servo pattern may be considered as a frameless continuous servo pattern. For example, a gap could be considered as part of the pseudo noise sequence, e.g., by not restricting a sequence to binary symbols. In another embodiment, the additional information may be encoded in one or more of the servo tracks by one or more additional pseudo noise sequences interleaved with the pseudo noise sequence which is characteristic for the servo track.

Hence, the servo band preferably is reserved for servo patterns aiming at fast and granular acquisition of lateral position information. The servo patterns preferably have an inherent high density in magnetic transitions—this is why these servo patterns here also are referred to as high density patterns—in order to enable frequent and, subject to the granularity of the servo tracks in the servo band, very accurate estimates of servo channel parameters such as the lateral position, thereby enabling improved tape head positioning at a much wider tape velocity range and supporting for larger bandwidth head actuation. The usage of only two different servo patterns in a servo band provide for a balance between servo writer and servo reader manufacturing efforts: At the cost of providing two servo readers only two servo writers per servo band are to be provided which is beneficial in view of servo writers being more difficult to be manufactured. In addition, owed to a longitudinal offset of servo writer gaps of a servo write head with three or more servo writers, a dynamic skew angle between the tape storage medium and the servo write head may lead to a servo track width variation. This effect is reduced when using solely two servo writers.

The embodiments of the present invention may enable an increase in data track density envisaged for future tape drives, given that the lateral position of the tape head and potentially its skew with respect to tape can be determined at a finer scale, at a higher estimation rate, and with lower latency compared to conventional tape storage systems. The high density servo pattern may allow for a repetition rate of head lateral position estimates sufficiently high to guarantee proper track following operation even at a very low tape velocity. In addition, the tape head may be positioned at any arbitrary lateral position owed to the detection of any such lateral position continuously during reading the servo band.

In addition, actuators of future tape heads with large bandwidths are supported. Hence, the presently introduced new servo format for tape storage media targets such as BaFe tape media, with 4, 8 or 16 data bands, and with 32 or 64 parallel data channel, as possible applications. Hence, a deviation in the position error signal (PES) is minimized thus enabling (data) track density scaling for tape capacities of up to hundreds of terabytes. In addition, data rate scaling with host computer requirements through the support of a wider velocity range may be improved. Furthermore, the high density pattern may also be utilized to generate a reference periodic signal (pilot signal) for aiding the timing recovery process for data detection in the data channels or for generating tape velocity information for tape velocity control.

Figure 1:
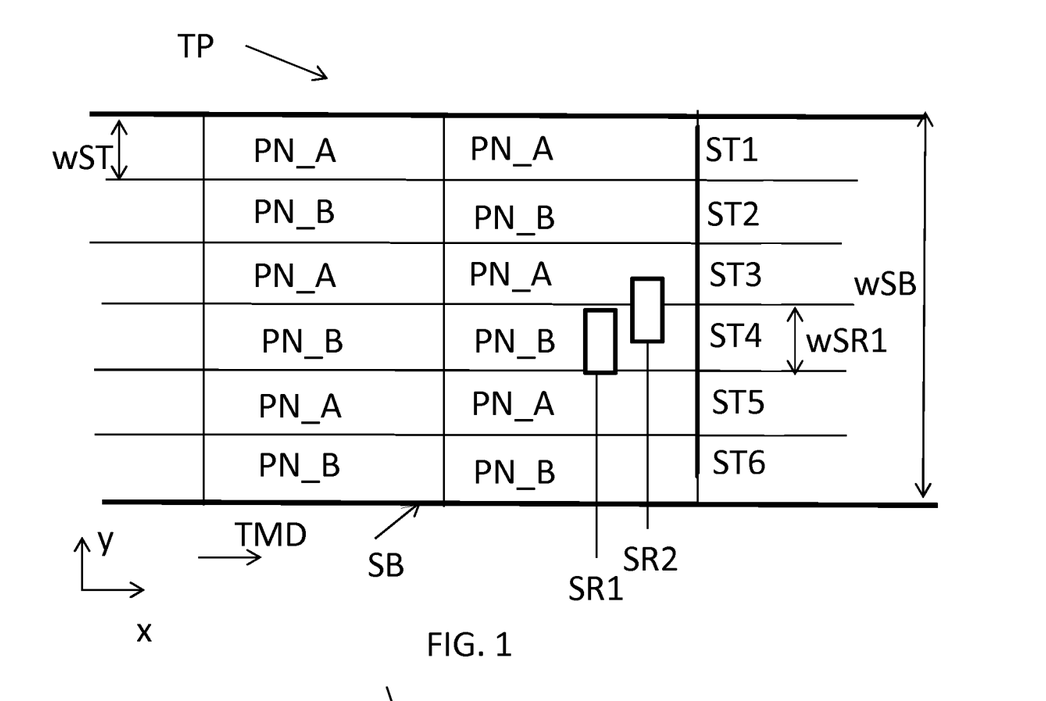
FIG. 1 is a top view on a schematic tape storage medium according to an embodiment of the present invention.

FIG. 1 provides an illustration of a section of a servo band SB contributing to a tape storage medium TP together with data bands and possibly further servo bands. The servo band SB extends along a longitudinal axis x which at the same time represents the direction into which the tape storage medium TP extends, and along which the tape storage medium TP is moved during operation, i.e., the tape moving direction TMD. Preferably, the servo band SB extends all along the longitudinal extension of the tape storage medium TP such that the shown servo patterns represent only a very small cut whereas in practice the shown servo patterns are repeated for several million times along the tape storage medium TP in each servo band SB.

Figure 2:
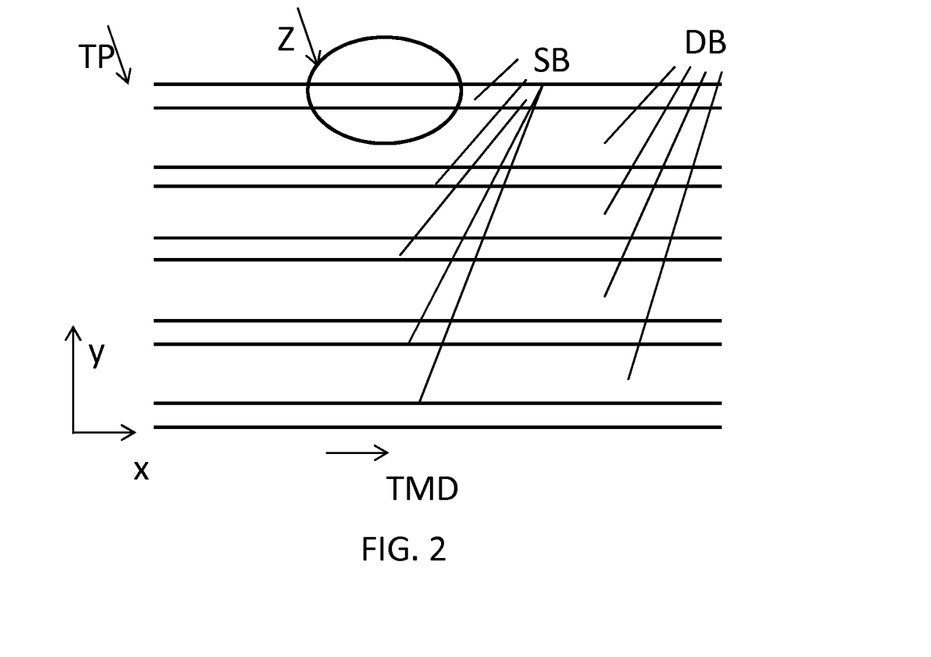
FIG. 2 is a top view on a portion of the tape storage medium as used in a tape storage system according to an embodiment of the present invention.

For illustrating a sample servo band/data band structure on a tape storage medium it is referred to FIG. 2. In this schematic top view on a section of a tape storage medium TP the tape TP has a longitudinal extension in x direction and a lateral extension in y direction. The longitudinal extension in x direction is parallel to a tape motion direction TMD, assuming there is no tape skew. Servo bands SB and data bands DB extend along the longitudinal extension of the tape TP. Each data band DB is arranged in between two servo bands SB. Each data band DB contains multiple data tracks not shown in detail wherein preferably multiple of these data tracks of a data band DB are written and/or read simultaneously in case a tape head of the tape drive provides multiple write and/or read elements. Each servo band SB contains servo patterns arranged along the longitudinal extension of the tape TP, such as shown in FIG. 1. In particular, a cutout Z of the top most servo band SB may be illustrated in FIG. 1.

While reading and/or writing data from and/or to the tape, the tape moves relative to a tape head in the longitudinal direction x. In addition, the tape head preferably is movable in the lateral direction y, i.e., transverse to the direction x, by means of a suitable actuator. However, due to a lateral offset of the tape with respect to the tape head, a misalignment of both may occur. For realigning the tape with the tape head, the position of the tape head relative to the tape is estimated from the signal obtained by reading the servo patterns in the servo band.

Returning to FIG. 1, the servo band SB is organized in multiple parallel servo tracks STx. In the present embodiment, six adjacent servo tracks ST1 to ST6 are provided, however, any number of servo tracks≥2 may be provided subject to the sensitivity in lateral position sensing to be achieved, subject to a width provided for the servo band SB, and subject to a width wSR1 and wSR2 of assigned servo readers SR1 and SR2. It is assumed that preferably each servo track STx is of the same width wST in lateral dimension y, i.e., orthogonal to the longitudinal extension x of the tape TP. Each servo track STx contains a dedicated servo pattern. The servo pattern in a servo track STx of the servo band SB may preferably be characterized by being a continuous servo pattern extending all along the servo band and consequently all along the tape storage medium TP, and be characterized by being a frameless servo pattern such that lateral position information may be derived from the servo pattern continuously while reading with the servo readers SR1 and SR2 without the need to wait for the completion of reading an entire servo frame, as is the case, when operating with a frame based servo pattern.

Preferably, the storage patterns of adjacent servo tracks STx differ from each other such that they are orthogonal as previously described. In the present example, only two different servo patterns are used which are applied alternating to the servo tracks ST1 to ST6. The servo pattern in each servo track STx may contain pseudo noise sequences PN_x. Following the above, two different pseudo noise sequences PN_A and PN_B are used for building the two different servo patterns. Servo track ST1 contains a repetition of the pseudo noise sequence PN_A contributing to the corresponding servo pattern. Servo track ST2 contains a repetition of pseudo noise sequence PN_B contributing to the corresponding servo pattern. In the present example, every two adjacent servo tracks STx contain a servo pattern based on different pseudo noise sequences. Moreover, the same servo pattern is applied to every second servo track, such that the servo tracks ST1, ST3 and ST5 contain the identical servo pattern. So do the servo tracks ST2, ST4 and ST6 respectively. In this embodiment, the set of servo tracks is organized into doublets of identical servo tracks wherein in each doublet waveforms originating from two different pseudo noise sequences are used. Instead of the servo band SB containing six servo tracks STx, three, four, or five servo tracks STx may be used instead, or even more than six servo tracks STx.

The two servo readers SR1 and SR2 assigned to presently read the servo band SB of the tape TP each have a width wSR1 and wSR2 of at least half the width wST of each servo track STx, i.e., wSR≥½*wST, and presently a width wSR1, wSR2 equal to the width wST of each servo track ST such that wSR1=wSR2=wST. In case of servo tracks ST of different width wST each servo reader SR1 and SR2 has a width wSR1 and wSR2 of at least half the width wST of the servo track STx with the smallest width wST. The widths wSR1 and wSR2 of the servo readers SR1 and SR2 reflect their extension into lateral direction y, i.e., orthogonal to the longitudinal extension x of the tape TP.

The two servo readers SR1 and SR2 are offset from each other orthogonal to the longitudinal extension x of the tape storage medium TP. In the present example, the servo readers SR1 and SR2 are offset by half the width of the servo track, i.e., oR=½*wST. In the present example, the two servo readers SR1 and SR2 are also offset from each other along the longitudinal extension x of the tape storage medium TP such that they overlap and as a result read components of the same servo information from the servo band. While moving the tape TP across the tape head including the servo readers SR1 and SR2 in tape motion direction TMD, the servo readers SR1 and SR2 each provide a sensor signal, also denoted as readback signal, containing at least components of one of the two pseudo noise sequences PN_A and PN_B. Subject to the lateral position of the servo reader SR, energies of the two pseudo noise sequence components PN_A and PN_B in the two readback signals vary. From the presence and the energies derived by correlating the readback signal width the known PN sequences, a lateral position value of the servo readers SR1 and SR2 with respect to the tape TP can be derived. In the present scenario, the first servo reader SR1 provides a readback signal containing a maximum energy content of pseudo noise sequences PN_B while the second servo reader SR2 provides a readback signal containing half of the maximum energy content of pseudo noise sequences PN_A and PN_B each.

In a preferred embodiment, additional information may be encoded into the servo tracks STx. Such additional information may, for example, be the presently scanned longitudinal position of the tape TP. Such longitudinal position information, also denoted as LPOS, may in one embodiment be encoded in the servo patterns of all servo tracks STx. Hence, the longitudinal position of the tape may be identified based on the LPOS information read by the servo readers SR1 and SR2. The LPOS information may be used for winding the tape media to a given longitudinal position and, for example, starting reading and/or writing at such specified longitudinal position. Other information such as manufacturing information may be added too, preferably to each servo track, which, for example, may indicate the manufacturer of the tape cartridge, the date of manufacturing the tape cartridge, information as to the standard the present cartridge may conform to, etc. Other additional information may be a servo band identifier or an identifier of a servo track subset identifier, such as, for example, for identifying in which servo track subset, e.g., doublet, the servo readers currently read from. This information may be due to its nature different in each servo band or each servo track subset.

Generally, the presently introduced new servo format with a set of servo tracks adjacent to each other may claim the same width wSB of the tape, see FIG. 1, as previously used servo formats may have. In other embodiments, the presently introduced new servo format with a set of servo tracks adjacent to each other may claim a width wSB of the tape smaller than previously used servo formats.

Figure 3:
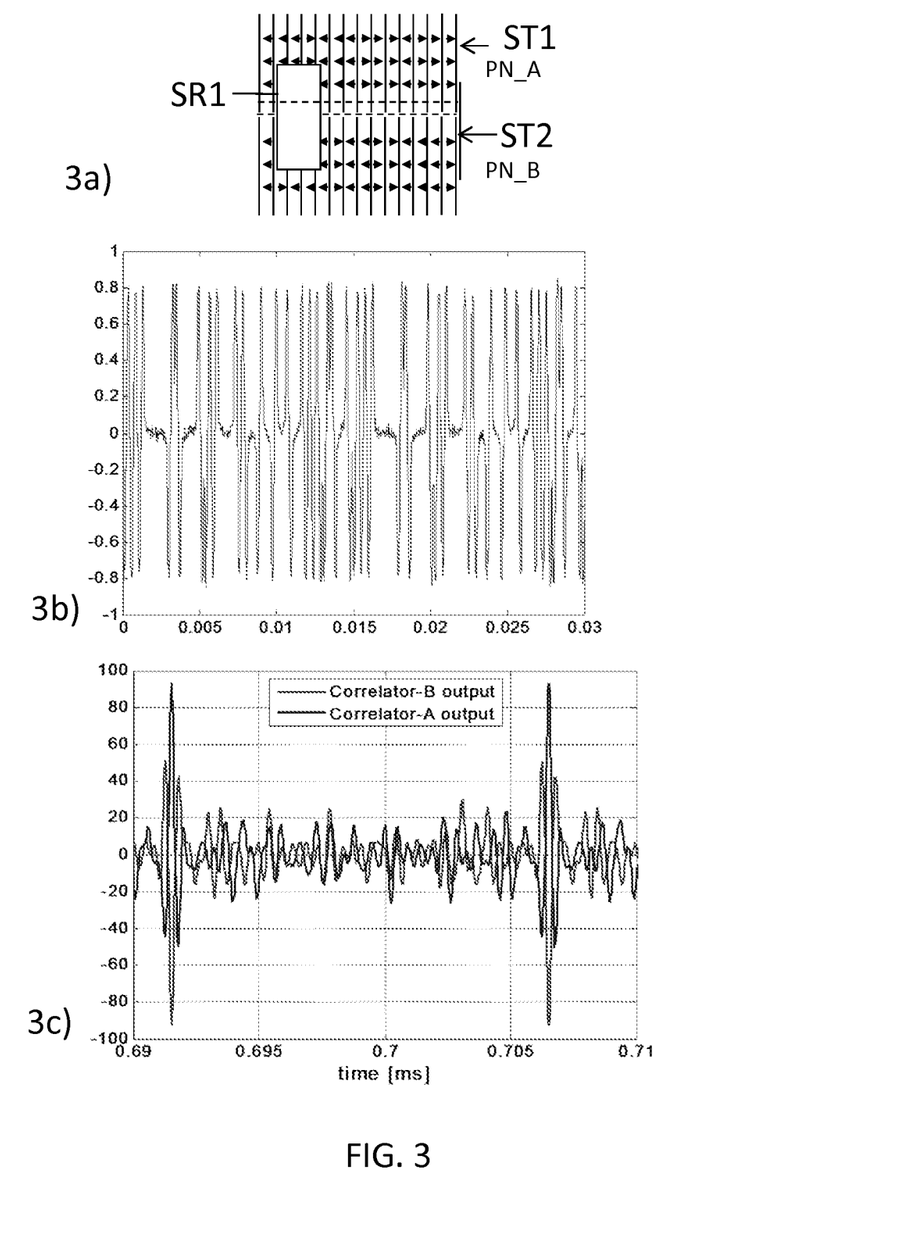
FIGS. 3A, 3B and 3C is a top view on a schematic tape storage system according to an embodiment of the present invention, and related diagrams.

FIG. 3 illustrates in diagram a) a subsection of a servo band with two servo tracks ST1 and ST2 and a single servo reader SR1 of a width corresponding to the width of the servo tracks STx while the second servo reader is not visible and may be offset for more than 1.5 times the width of the servo tracks STx and reading servo information from additional servo tracks not shown either. The diagram is solely for illustrating the concept of reading servo patterns resulting in orthogonal waveforms and their appearance in the readback signal of a servo reader. A first pseudo noise sequence PN_A is used in servo track ST1, which for example may have a length of 76 µm and contain 31 symbols, which results in a symbol length of 2.45 µm. For example, assuming a tape velocity of 5.1 m/s, the pseudo noise sequence repetition interval is equal to 14.9 µs. A symbol refers to the length of one bit in the waveform.

In servo track ST2, a second pseudo noise sequence PN_B is used, again having a length of 76 μm and containing 31 symbols.

In diagram 3b), a readback signal is shown in the time domain for the servo reader SR being positioned according to diagram 3a) and covering the first and the second servo track ST1 and ST2 to the same extent. The readback signal may preferably be supplied, in the present example, to two correlators where it is correlated with the two pseudo noise sequences PN_A. and PN_B. The output of the correlators is shown in diagram 3c), wherein the positive peaks originate from the correlation of the readback signal with the first pseudo noise sequence PN_A and the negative peaks originate from the correlation of the readback signal with the second pseudo noise sequence PN_B such that the presence of these two pseudo noise sequences can clearly be derived from the readback signal. Further, when looking at the amplitudes/magnitudes of the peaks in the accumulated output of the correlators, it can be derived that both pseudo noise sequences appear with equal energies given that the servo reader SR overlaps both servo tracks ST1 and ST2 to the same extent. In any case, the adjacent servo patterns are chosen such that they show very low cross correlation values and thus can be discriminated with negligible interference. In the present example, the tape is assumed to be moved at a speed of 5.1 m/s.

The results presented above have been obtained by assuming perfect alignment between the phases of the pseudo noise sequences. This means that the correlation peaks at the output of the correlators of the detector occur at the same time instants. If the assumption of perfect phase alignment is removed, there is a finite range of phase shifts between the pseudo noise sequences, within which the cross-correlation values between pseudo noise sequences can be considered negligible for the computation of the PES estimates. In a preferred embodiment, a phase shift between pseudo noise sequences of adjacent servo tracks are within ±12.5% of the symbol length for assuming the cross-correlation between the two pseudo noise sequences to be negligible. In case a phase shift between the pseudo noise sequences of adjacent servo tracks cannot be controlled while writing the pseudo noise sequences, it is preferred to estimate a phase shift and apply cancellation techniques to subtract a cross correlation term from the correlation peak value at the output of each correlator.

Hence, in general the servo reader provides a readback signal that can be filtered by correlators matched to the pseudo noise sequences used for determining a lateral position value. The servo patterns in the servo band may also be used to generate a pilot signal supporting a timing recovery process of data in the data tracks. A servo reader position relative to an edge between adjacent servo patterns of adjacent servo tracks in the servo band can be derived from the readback signal of the servo reader that is provided to a detector that detects and discriminates an energy contained in the different servo patterns sensed by the servo reader. Ambiguity between repeating servo patterns may be avoided by encoding servo track subset information into the servo tracks. The same detection procedure may be applied to the readback signal of the second servo reader not visible.

Figure 4:
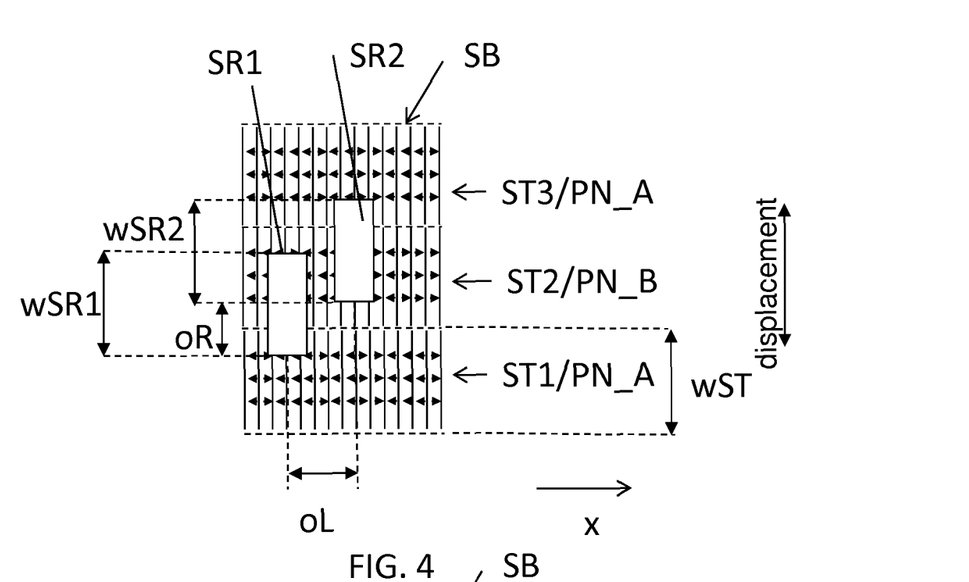
FIG. 4 is a top view on a schematic tape storage system according to an embodiment of the present invention.

In FIG. 4 an embodiment of a servo band SB containing three servo tracks ST1 to ST3 is shown with the first servo track ST1 and the third servo track ST3 containing a servo pattern with a first pseudo noise sequence PN_A, and the second servo track ST2 containing a second servo pattern with a second pseudo noise sequence PN_B which is orthogonal to the first pseudo noise sequence PN_A. Again, servo readers SR1 and SR2 are provided each with a width wSR1 and wSR2 corresponding to the width wST of each servo track STx, i.e., wSR1=wSR2=wST. The second servo reader SR2 is offset by oR from the first servo reader SR1 in lateral direction y, which offset presently is ½*wST. In the longitudinal direction, the two servo readers SR1 and SR2 are offset by oL which may at least exceed a length of the servo readers SR1 and SR2 in longitudinal direction x.

Figure 5:
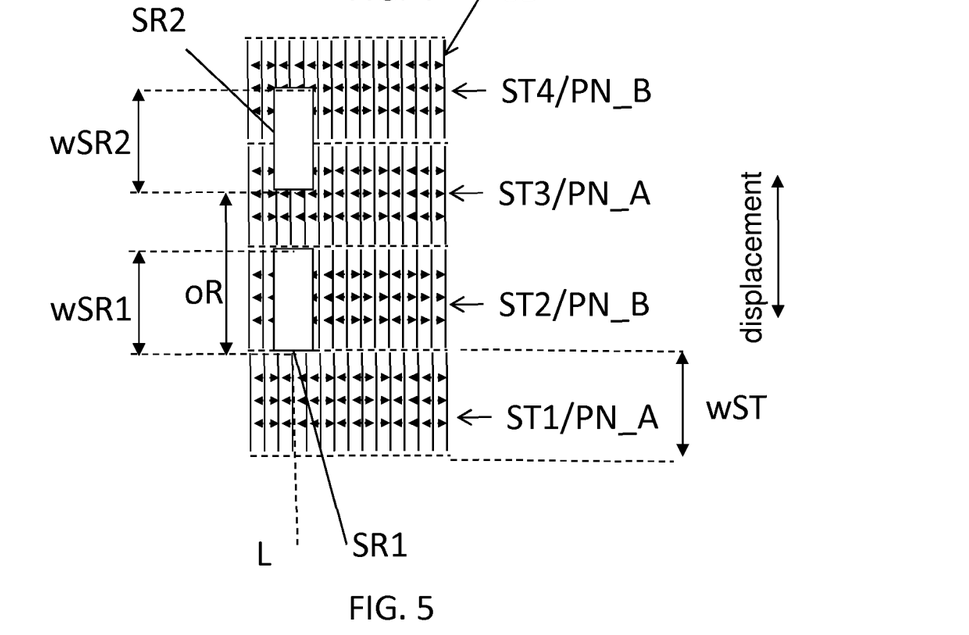
FIG. 5 is a top view on a schematic tape storage system according to an embodiment of the present invention.

In the embodiment of FIG. 5, the servo band SB contains four servo tracks ST1 to ST4, wherein the first and third servo track ST1 and ST3 each contain the first pseudo noise sequence PN_A, and the second and fourth servo track ST2 and ST4 each contain the second pseudo noise sequence PN_B. In the present example, the arrangement of the two servo readers SR1 and SR2 is different to the embodiment of FIG. 4. The offset in lateral direction y now is 1.5*wST while the two servo readers SR1 and SR2 are not offset in longitudinal direction x. Both reside at the same longitudinal position L.

Figure 6:
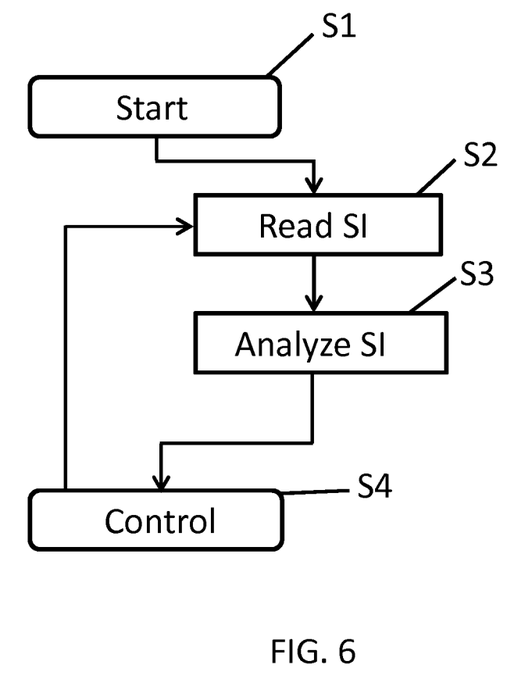
FIG. 6 is a flowchart representing a method for operating a tape storage system according to an embodiment of the present invention.

FIG. 6 shows a flow chart according to an embodiment of the present invention. In step S1, the method is started, for example, by activating the tape drive for reading and or writing data to a tape storage medium in a tape cartridge inserted into the tape drive. It is assumed that the tape is already positioned at the desired longitudinal position. Then, while in step S1 the tape is already moved at a desired tape velocity, in step S2 the servo information (SI) from the servo band is read. In step S3, the servo information read by the servo reader assigned to the servo band is analyzed and a lateral position value is determined from the readback signal of the servo reader. Preferably, a correlation analysis is performed on the readback signal and the lateral position value is estimated based on the energy of the signal components in the readback signal. Hence, a control signal is derived from the lateral position value for controlling the actuator of the tape head for repositioning the tape head laterally in step S4. The process continues by reading the servo information by the servo reader in step S2, which process of course is continuous. The rate of providing the lateral position values in this frameless servo pattern is not limited to a servo pattern segment to be first completely scanned before gaining information on the lateral position. Instead, the rate of the second lateral position values may be as fast as the length of a symbol and, of course, further depends on the tape velocity.

Figure 7:
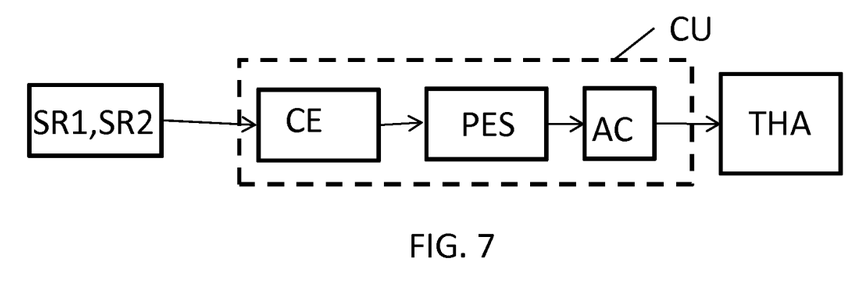
FIG. 7 is a block diagram of selected items of a tape storage system according to an embodiment of the present invention.

FIG. 7 illustrates a block diagram of a tape drive of a tape storage system according to an embodiment of the present invention. The servo readers SR1 and SR2 provide their readback signal to a control unit CU. The readback signals of the servo reader SR1 and SR2 are received by a correlation entity CE and a lateral position value is determined. The lateral position value is then converted into a position error signal by a determination unit PES. A tape head actuator controller AC unit translates the position error signal PES into a control signal for the tape head actuator THA, which then adjusts the lateral position of the tape head to which the servo reader SR is attached to.

Note that in all the considered embodiments the high density pattern may be utilized to generate a reference signal for aiding the timing recovery process for data detection in the data channels.

It will be understood by those skilled in the art that many modifications and permutations may be made without departing from the scope of the present invention.

As will be appreciated by one skilled in the art, aspects of the present invention may be embodied as a tape storage system, a method for operating a tape storage system, or a computer program product. Accordingly, aspects of the present invention, in particular in form of the controller/ control unit, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention, such as the write methods, may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A tape storage system, comprising:
a tape head configured to read and/or write data from and/or to a tape storage medium;
the tape storage medium comprising at least one servo band along a longitudinal extension of the tape storage medium to determine positional information, and wherein:
the servo band comprises a set of servo tracks having a width extending along the longitudinal extension of the tape storage medium and arranged next to each other;
each servo track of the set contains a servo pattern;
a total of two different servo patterns is contained in the set of servo tracks;
the servo patterns of adjacent servo tracks are different from each other;
the tape head comprises two servo readers configured to read from the servo band;
a width of each servo reader orthogonal to the longitudinal extension of the tape storage medium is at least half the width of a servo track; and
the two servo readers offset from each other by a lateral offset distance (oR) orthogonal to the longitudinal extension of the tape storage medium in accordance with the expression oR=d*wST+n*wST, wherein wST is the width of the servo track, with 0<d<1, and with n being an integer n=[0, 1, 2 . . . , N] where N corresponds to the number of servo tracks in the set, such that the lateral offset distance oR is always unequal to a multiple of the servo track width wST.

2. The tape storage system according to claim 1, wherein:
n=0, such that the lateral offset distance oR is less than the servo track width wST; and
the two servo readers are offset from each other along the longitudinal extension of the tape storage medium.

3. The tape storage system according to claim 1, wherein:
n≠0, such that the lateral offset distance oR is greater than the servo track width wST; and
wherein the two servo readers are arranged at the same longitudinal position with respect to the longitudinal extension of the tape storage medium.

4. The tape storage system according to claim 1, wherein 0.3<d<0.7.

5. The tape storage system according to claim 1, wherein d=0.5.

6. The tape storage system according to claim 1, wherein:
the tape head comprises a total of two servo readers assigned for reading from the servo band; and the width of each servo reader is equal to the width of a servo track.

7. The tape storage system according to claim 1, wherein the width of each servo reader is not more than twice the width of the servo track.

8. The tape storage system according to claim 1, wherein:
each servo pattern in a servo track represents a waveform when being read; and
the waveforms of adjacent servo tracks are orthogonal to each other.

9. The tape storage system according to claim 8, wherein:
the servo pattern of each servo track of the set contains magnetic transitions at a defined frequency; and
the frequencies of magnetic transitions of servo patterns of adjacent servo tracks are different from each other.

10. The tape storage system according to claim 8, wherein:
the servo pattern of each servo track of the set contains a pseudo noise sequence of symbols; and
the pseudo noise sequences of servo patterns of adjacent servo tracks are different from each other.

11. The tape storage system according to claim 10, wherein the two pseudo noise sequences of symbols are written such that a phase shift between corresponding symbols located on adjacent tracks is within ±12.5% of a symbol length.

12. The tape storage system according to claim 1, wherein additional information is encoded in the servo pattern of one or more of the servo tracks, which additional information is one or more of: longitudinal position information, manufacturing information, a servo band identifier, and a servo track subset identifier.

13. The tape storage system according to claim 1, wherein the servo pattern of one or more of the servo tracks is designed to allow one or more of: generating a reference periodic signal from a readback signal from one or more of the servo readers for supporting a timing recovery process for data detection purposes or generating tape velocity information for tape velocity control purposes.

14. A method for operating a tape storage system, the method comprising:
reading a servo band by two servo readers configured to read from the servo band; and
determining a lateral position value of a tape head containing the servo readers relative to a tape storage medium from a readback signal of the servo readers and adjusting a lateral position of the tape head dependent on the lateral position value;
wherein the tape storage system comprises:
the tape head configured to read and/or write data from and/or to the tape storage medium;
the tape storage medium comprising the servo band along a longitudinal extension of the tape storage medium to determine positional information;
the servo band comprising a set of servo tracks having a width extending along the longitudinal extension of the tape storage medium and arranged next to each other;
each servo track of the set containing a servo pattern;
a total of two different servo patterns contained in the set of servo tracks;
the servo patterns of adjacent servo tracks being different from each other;
the tape head comprising the two servo readers configured to read from the servo band;
a width of each servo reader orthogonal to the longitudinal extension of the tape storage medium is at least half the width of a servo track; and
the two servo readers offset from each other by a lateral offset distance (oR) orthogonal to the longitudinal extension of the tape storage medium in accordance with the expression oR=d*wST+n*wST, wherein wST is the width of the servo track, with 0<d<1, and with n being an integer n=[0, 1, 2 . . . , N] where N corresponds to the number of servo tracks in the set, such that the lateral offset distance oR is always unequal to a multiple of the servo track width wST.

15. The method according to claim 14, wherein:
n=0, such that the lateral offset distance oR is less than the servo track width wST; and
the two servo readers are offset from each other along the longitudinal extension of the tape storage medium.

16. The method according to claim 14, wherein:
n≠0, such that the lateral offset distance oR is greater than the servo track width wST; and
wherein the two servo readers are arranged at the same longitudinal position with respect to the longitudinal extension of the tape storage medium.

17. The tape storage system according to claim 14, wherein 0.3<d<0.7.

18. The method according to claim 14, wherein d=0.5.

19. The method according to claim 14, wherein:
the tape head comprises a total of two servo readers assigned for reading from the servo band; and
the width of each servo reader is equal to the width of a servo track.

20. A computer program product comprising a non-transitory, computer readable storage medium having computer readable program code embodied therewith, the computer readable program code comprising instructions that, when executed by a computer perform a method for operating a tape storage system, the method comprising:
reading a servo band by two servo readers configured to read from the servo band; and
determining a lateral position value of a tape head containing the servo readers relative to a tape storage medium from a readback signal of the servo readers and adjusting a lateral position of the tape head dependent on the lateral position value;
wherein the tape storage system comprises:
the tape head configured to read and/or write data from and/or to the tape storage medium;
the tape storage medium comprising the servo band along a longitudinal extension of the tape storage medium to determine positional information;
the servo band comprising a set of servo tracks having a width extending along the longitudinal extension of the tape storage medium and arranged next to each other;
each servo track of the set containing a servo pattern;
a total of two different servo patterns contained in the set of servo tracks;
the servo patterns of adjacent servo tracks being different from each other;
the tape head comprising the two servo readers configured to read from the servo band;
a width of each servo reader orthogonal to the longitudinal extension of the tape storage medium is at least half the width of a servo track; and
the two servo readers offset from each other by a lateral offset distance (oR) orthogonal to the longitudinal extension of the tape storage medium in accordance with the expression oR=d*wST+n*wST, wherein wST is the width of the servo track, with 0<d<1, and with n being an integer n=[0, 1, 2 . . . , N] where N corresponds to the number of servo tracks in the set, such that the lateral offset distance oR is always unequal to a multiple of the servo track width wST.

* * * * *